H. H. JONES.
GARBAGE RECEPTACLE.
APPLICATION FILED MAY 22, 1914.
1,136,235.
Patented Apr. 20, 1915.
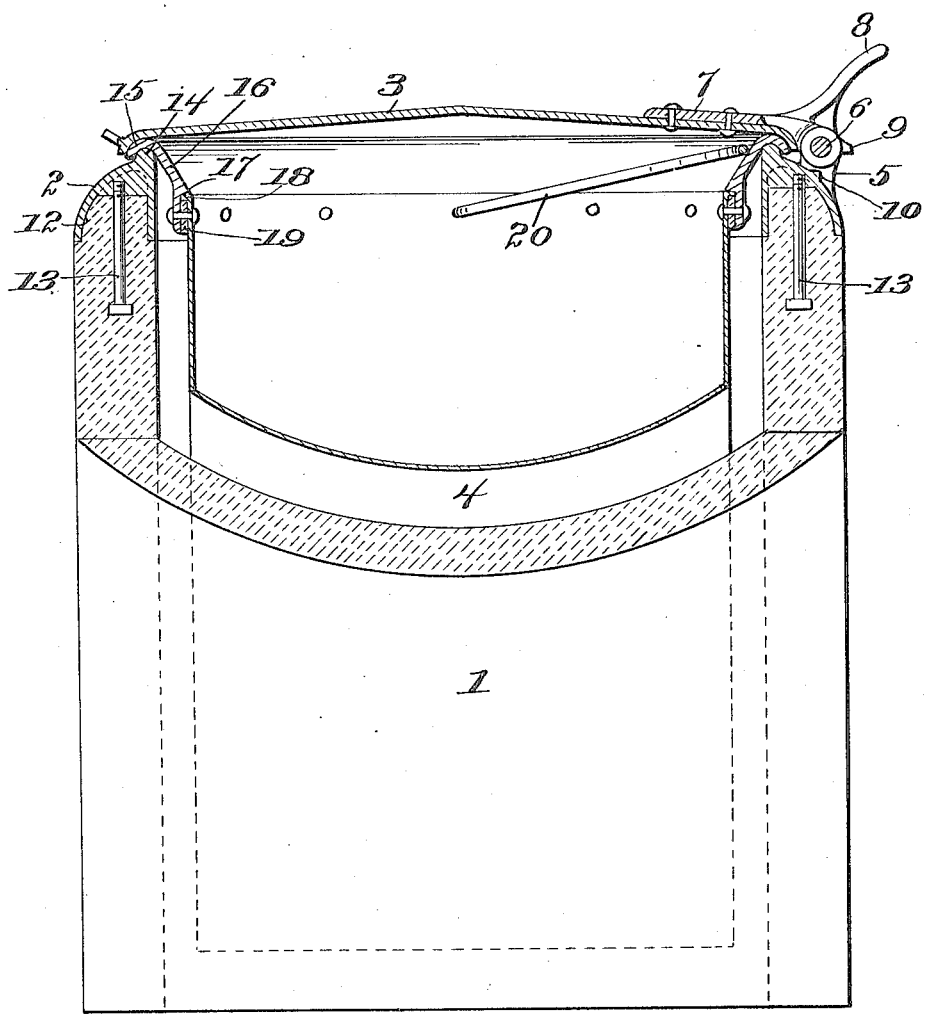

UNITED STATES PATENT OFFICE.

HENRY H. JONES, OF MEDFORD, MASSACHUSETTS.

GARBAGE-RECEPTACLE.

1,136,235. Specification of Letters Patent. Patented Apr. 20, 1915.

Application filed May 22, 1914. Serial No. 840,346.

*To all whom it may concern:*

Be it known that I, HENRY H. JONES, a citizen of the United States, residing in Medford, in the county of Middlesex and State of Massachusetts, have invented an Improvement in Garbage-Receptacles, of which the following description, in connection with the accompanying drawings, is a specification, like letters on the drawings representing like parts.

The present invention relates to a garbage receptacle, and is embodied in a receptacle of the underground type, in which an outer casing is permanently buried in the ground and provided with a removable inner receptacle to receive the garbage, the said receptacle being removable for the purpose of easily removing the garbage when the capacity of the receptacle has been reached. It is important in this kind of a structure to close as fully as possible the interior of the permanent casing so as to keep it clean and free from garbage which would otherwise collect and decay. In most of the receptacles of this kind now in use, two covers are employed, one to open the permanent casing for the purpose of removing the receptacle, and the other for the purpose of affording an opening when the garbage is emptied into the receptacle. In accordance with my invention only one cover is necessary and the removable receptacle is so constructed that it effectually closes the main casing as well as the receptacle; the arrangement being such, moreover, that the receptacle, when in place, tightly closes the entire outer casing whether the cover is open or closed.

The drawing is a vertical section partly in elevation of a garbage receptacle constructed in accordance with my invention.

The permanent casing is shown as consisting of a tube 1 of cement, or other substance, which is not damaged by the moisture of the ground, the said tube being crowned at the top with an annular rim 2 preferably of metal, which constitutes the support for the cover 3 as well as for the removable receptacle 4. In the construction shown, the cover 3 consists of a thin sheet of metal, preferably pressed steel, curved downward around its outer periphery so as to fit closely over the top of the receptacle, which, in turn is supported directly on the rim 2. This cover is shown as hinged on the rim 2, which is provided with upwardly projecting lugs 5, which afford a support for a pintle 6, which extends across between the said lugs through the pivot portion of a hinge 7, shown as riveted to the cover 3. The said cover is further provided with a foot-piece 8 for the purpose of opening the cover; and at the rear of the hinge 7 is a projection 9 adapted to engage a lug 10 so that the cover cannot be opened beyond a vertical position, and therefore can not be accidentally left open. The rim 2 is shown as provided at the bottom with an annular space 12, and fastening bolts 13 are screwed upward into the bottom of the annular rim, after which the plastic material of which the tube 1 is made in its unhardened condition is molded with its upper portion in the space 12 and then allowed to harden so that the bolts 13 are embedded in the hardened plastic material and constitute a permanent fastening device. The upper part of the annular rim is provided with an upwardly projecting bead 14, preferably rounded at the top, the said bead constituting the support for the removable receptacle 4, which is shown as provided with an annular lip 15 which rests directly on the rim 2. The said lip is preferably concavo-convex in shape, so as to fit the rounded bead 14 as clearly shown. The cover 3 is curved downward at the edge, so as substantially to conform to the lip at the top of the receptacle 4, and the weight of the cover, which is borne wholly by the top of the receptacle, holds all the parts tightly together, thus making a substantially perfect seal. The removable receptacle 4 is outwardly tapered at the top, so that the said receptacle will drop freely into the main casing. The said receptacle may be constructed in any suitable way, but as herein shown, the main body of the receptacle is of sheet metal riveted to an annular rim portion 16 which is preferably of cast metal, since this is the portion which has the lip 15, and the said lip can be more accurately and inexpensively formed in a casting than it can if made of sheet metal integral with the body of the can.

In order that the entire inner wall of the receptacle 4 may be substantially smooth so that it is easily cleaned and free from places where garbage can collect, I have shown the annular rim portion 16, as provided with an annular recess 17, to receive a small flange 18, formed around the top of the sheet metal portion of the receptacle, the top of the recess and flange being of equal length so that the inner wall of the receptacle is flush with the inclined upper surface of the rim-portion 16.

In order to strengthen the construction, I interpose between the outer wall of the receptacle 4 and the part 16, a ring 19 which comes below the flange 18; and the part 16, the ring 19, and the sheet metal wall of the receptacle 4 are riveted together. The said receptacle 4 is shown as provided with a bail 20 whereby it may be easily removed from the permanent casing when the cover is opened.

The garbage receptacle above described is simple in construction and is very effectually closed and protected. Both receptacles are entirely devoid of any shoulders or recesses below the top of the removable receptacle, where garbage can collect and decay, so that the whole device is easily kept clean.

What I claim is:

1. A garbage receptacle comprising a main casing of plastic material; a metallic rim secured to the top of said casing and provided with an upwardly projecting annular bead; a removable receptacle, the body portion of which is of sheet metal, to which is secured, at the top, an annular rim of cast metal, provided with a concave lip shaped to fit over the said upwardly projecting bead, thereby completely closing the said main casing; and a cover hinged to the top of the said metallic rim around the main casing at a point outside of the upwardly projecting bead, thereon, the said cover when closed fitting over and engaging the top of the lip around the removable receptacle.

2. The combination with a main casing having a smooth cylindrical inner surface and being provided with a hinged cover at the top; of a removable receptacle provided with an annular metallic rim portion having a lip adapted to overlie the top of the main casing between it and the cover, said metallic rim portion having an annular recess along its inner surface; a cylindrical body portion of sheet metal having a flange fitting the upper part of said recess; a ring fitting the space between the outer surface of said body portion and the wall of said recess below the flange; and rivets extending through said body portion, ring, and flange substantially as herein described.

In testimony whereof, I have signed my name to this specification in the presence of two subscribing witnesses.

HENRY H. JONES.

Witnesses:
JAS. J. MALONEY,
M. L. MALONEY.

Copies of this patent may be obtained for five cents each, by addressing the "Commissioner of Patents, Washington, D. C."